Jan. 19, 1926. 1,570,319

C. T. REYNOLDS

LOCK GEAR DISK WHEEL

Filed Dec. 28, 1923 2 Sheets-Sheet 1

Inventor:
Charles Telford Reynolds,

Hastings W. Baker
Att'y.

Jan. 19, 1926.  1,570,319
C. T. REYNOLDS
LOCK GEAR DISK WHEEL
Filed Dec. 28, 1923   2 Sheets-Sheet 2
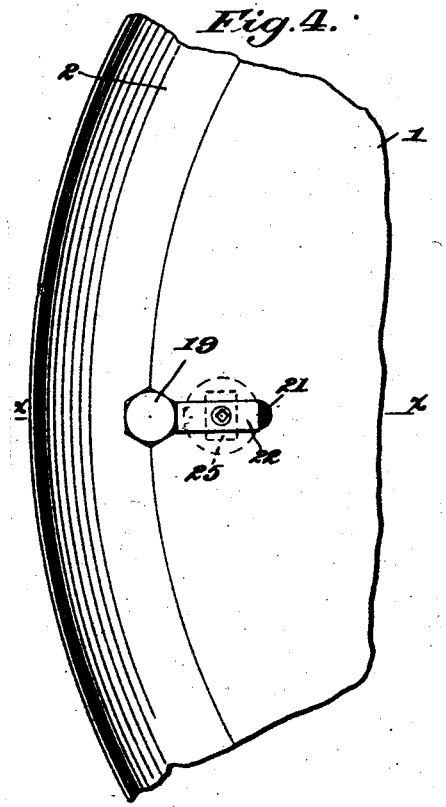
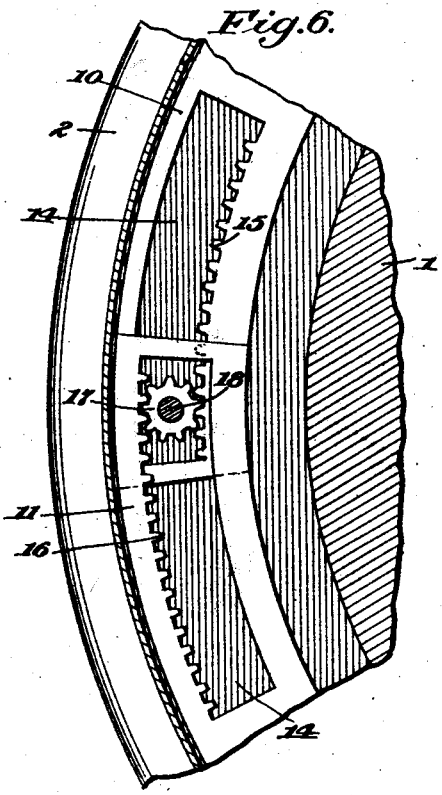
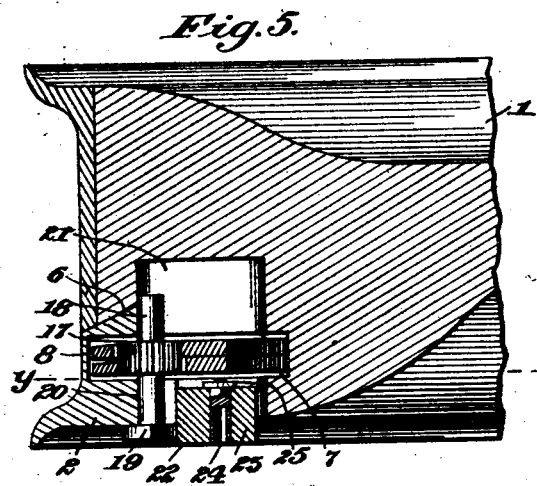
Inventor:
Charles Telford Reynolds,
Hastings W. Baker
Att'y.

Patented Jan. 19, 1926.

1,570,319

UNITED STATES PATENT OFFICE.

CHARLES TELFORD REYNOLDS, OF COLUMBIA, SOUTH CAROLINA, ASSIGNOR OF ONE-SIXTH TO CARRIE B. REYNOLDS, OF COLUMBIA, SOUTH CAROLINA.

LOCK-GEAR DISK WHEEL.

Application filed December 28, 1923. Serial No. 683,154.

*To all whom it may concern:*

Be it known that I, CHARLES TELFORD REYNOLDS, a citizen of the United States, residing at Columbia, in the county of Richland and State of South Carolina, have invented certain new and useful Improvements in Lock-Gear Disk Wheels, of which the following is a specification.

This invention relates to a lock gear disk wheel, and more specifically consists of a new and improved means for separating two sections of a disk wheel, so that the tire may be readily removed therefrom or placed thereon.

It has long been recognized that some improved method of removing a punctured tire from the wheel of an automobile was highly desirable, and various expedients have been resorted to. The object of this invention is to provide a means whereby the inner and outer sections of the wheel may be separated and the tire readily removed therefrom without necessitating the prying of the tire over the wheel rim. It has been found in actual practice that when a tire is pryed over the rim, either the tire or the inner tube may be damaged. It is, furthermore, known that when replacing the tire by forcing it over the rim, the tire tools frequently damage the inner tube. These inconveniences are entirely eliminated when my improved disk wheel is used, for no tire tools are required, and there is no prying or stretching operation.

More specifically, my invention relates to a geared ring made of spring or resilient material adapted to hold the two sections of the disk wheel together, or when contracted by means of the gears operated by a suitable pinion, to permit of the separation of the two sections without any tools of any kind being brought into contact with the tire.

Furthermore, my invention permits of a great saving in time, for the two sections may be separated by simply rotating a pinion by means of a wrench or other suitable tool, consuming a negligible amount of time.

Other advantages will appear in the detailed part of this specification.

Referring to the drawings in which like parts are designated by the same reference characters throughout:

Fig. 4 is an enlarged fragmentary side view showing the pinion operating head and locking means associated therewith;

Fig. 5 is a detail sectional view taken on the line *x—x* of Fig. 4; and

Fig. 6 is a sectional view taken on the line *y—y* of Fig. 5.

Figure 1:
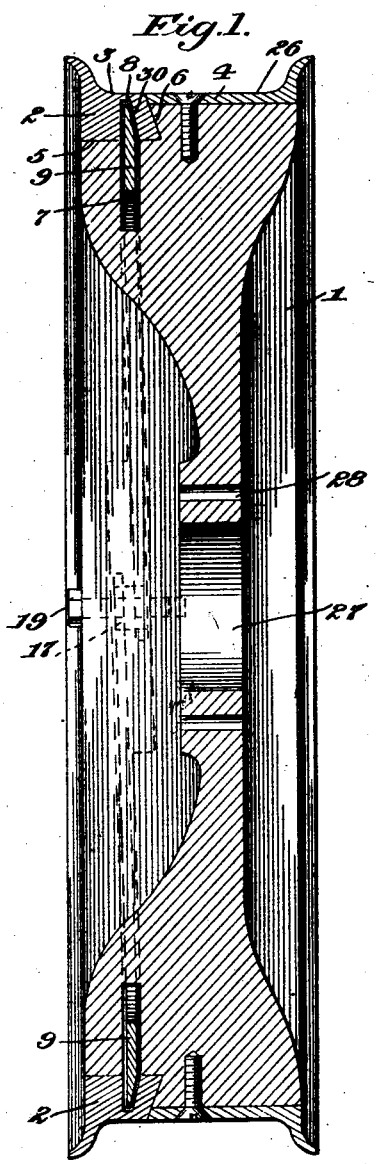
Figure 1 is a sectional view of my improved lock gear disk wheel.

My improved wheel consists of a conventional disk wheel 1, but having a cut away portion for the reception of the outer ring section 2, hereinafter referred to as the outer section. This outer section consists of a ring having its outer periphery 3 equal to the outer periphery 4 of the wheel section 1, and having its inner periphery 5 substantially less than its outer periphery, so as to provide a ring of suitable thickness and strength. The outer periphery 3 and the inner periphery 5 are united by a sloping surface 6. The cut out portion of the wheel is of such a shape as to snugly receive the outer section 2.

A channel 7 is provided in the wheel 1, which channel extends circumferentially around the wheel and in the same plane with the channel 8 in the outer section 2, which channel extends circumferentially within the outer section 2. The two channels 7 and 8 are slightly spiral, so as to receive a ring member 9, having overlapping ends 10 and 11. The ring member 9 is provided with a plurality of outstanding portions or lugs 12. Between the bases of the outstanding portions 12, the ring member 9 consists of relatively thin sections 13, which permit the ring member readily bending. The end 10 of the ring member is provided with a cut away portion 14, into which cut away portion outwardly extending rack teeth 15 project. The end 11 is a duplicate of the end 10 with the exception that the rack teeth 16 extend inwardly from the outer section of the ring into the cut away portion.

Adapted to mesh with the rack teeth 15 and 16, is a pinion 17 mounted on a shaft 18, which shaft is provided with a hexagonal head 19, as shown in Fig. 5. The shaft 18 passes through a radially extending slot 20 in the outer section 2 and through a radially extending slot 21 in the wheel section 1, the two slots serving as a journal for the shaft 18. The shaft 18 likewise passes through the two cut away portions 14 of the overlapping ends of the ring member 9. The pinion 17 is thus at all times held in mesh with the rack teeth 15 and 16.

The lugs 12 are of such a height that when the ring section 9 is expanded as much as it can be when assembled, the outer periphery of the lugs 12 will abut against the bottom of the channel 8, and at all times cause the thin sections 13 to lie within the channel 7 in the wheel section 1. When, however, the pinion is rotated so as to cause the ring member 9 to be contracted, the lugs 12 will be moved inwardly so as to draw the lugs 12 into the channel 7. The outer section 2 can then readily be removed by grasping the same with the hands or other suitable means.

A lock 22 is provided, which lock may be of any suitable construction, provided it may be inserted within the slot 20, when the shaft 18 is at its greatest radial distance from the center of the wheel, and thereby serves as a means to hold the shaft in such position.

I show a simple means of accomplishing this desired result consisting of a rectangular plug 23 provided with a bore, through which is inserted a rotatable member 24 adapted to receive a key and to turn a rectangular latch 25, so that the ends of the rectangular latch will abut against the outer side wall of the channel 7 and hold the rectangular plug in place. The latch 25 lies within a circular orifice shown in dotted lines in Figure 4 which construction permits of the rotation of the latch 25. One of the sides of the rectangular plug 23 is adapted to snugly fit against one side of the rectangular head 19, and thereby hold it against rotation. Such a lock, therefore, serves as a means to prevent the gear from being rotated either by accident or by a thief. It is impossible to remove the outer section 2 from the wheel section 1 unless the pinion 17 is rotated, and the lock, therefore, serves as a means to prevent the theft of a tire, or the accidental rotation of the pinion on account of the jolts in the road, while serving the additional function of preventing the ingress of dirt or other foreign matter into the channel sections 7 and 8.

As shown in Fig. 1, the lugs on the ring member 9 are provided with a cam surface 30, which cam surface serves as a means for centering the removable section 2 with relation to the disk wheel 1, and also serves the additional function of wedging the two sections together so that there shall be no free play between the said sections.

Figure 2:
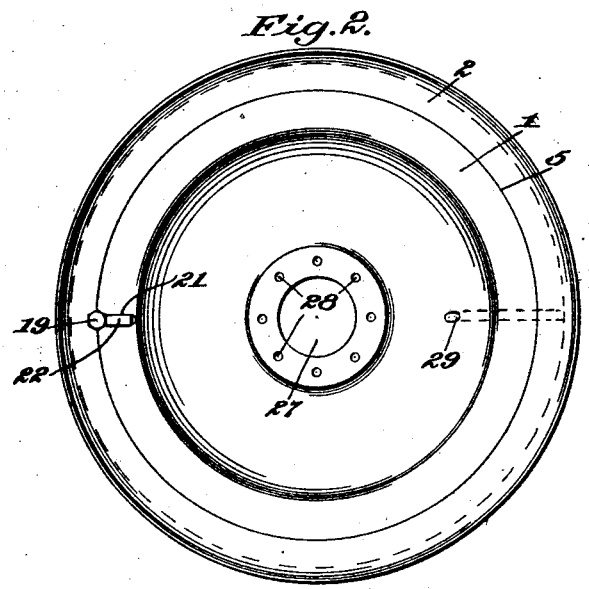
Fig. 2 is a side view of my improved wheel.
Figure 3:
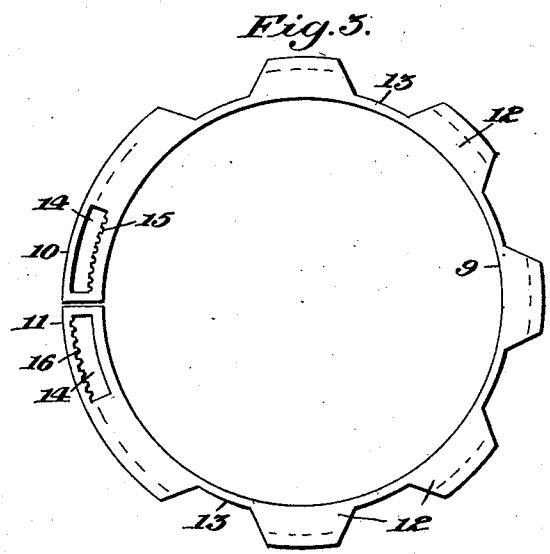
Fig. 3 is a detail view of the geared resilient ring, which serves as a means to connect the two sections of the disk wheel.

The wheel section 1 is conventional, except as hereinbefore described, and is, of course, provided with a detachable rim 26, hub bore 27, and bolt holes 28 whereby the same may be secured in the conventional manner. A bore to serve for the insertion of the valve is provided diametrically opposite from the shaft 18 and is represented by the reference character 29 in Fig. 2 of the drawings.

It is obvious that modifications might be made in the specific structure herein shown without departing from the spirit of this invention. I have, therefore, reserved the right to make any modifications that might fall within the spirit and scope of the appended claims.

I claim:—

1. In combination, a wheel divided circumferentially into two sections, each of which sections is provided with a groove opening into the other, an expansible ring inserted into said grooves, and means whereby the ring may be contracted into one of the grooves so that the other section may be removed therefrom.

2. In combination, a wheel divided circumferentially into two sections, each of which sections is provided with a spiral groove opening into the other, an expansible spiral ring having overlapped ends inserted into said grooves, and means whereby the ring may be contracted into one of the grooves so that the other section may be removed therefrom.

3. In combination, a wheel divided into two sections and provided with a radially extending slot, each of said sections having a groove cooperative with the groove in the other section, a toothed ring inserted in said grooves, a shaft, a pinion carried by the said shaft and meshing with the toothed section of the ring and serving as a means to contract the same, the slot serving as a means to prevent circumferential movement of the shaft in relation to the wheel.

4. In combination, a wheel divided circumferentially into two sections, each of said sections having a groove, a ring having overlapped ends inserted into said grooves, each of said ends being provided with a rack, a shaft whereby said racks may be actuated and means inserted within a slot in one of the wheel sections so as to prevent the radial movement of the shaft and thereby to lock the parts into position.

5. In combination, a wheel divided circumferentially into two sections, each of said sections having a spiral groove cooperating with the groove of the other section, a spiral ring inserted in the said grooves, said ring having overlapped ends having cut away rectangular portions, oppositely extending teeth carried by the respective ends of said ring and extending into said cut away portions, a shaft inserted through the two cut away portions, a pinion carried by said shaft and adapted to mesh with the teeth of the overlapped ends, whereby said ring may be contracted so as to withdraw the same entirely within one of the grooves, the outer part of one of the cut away portions and the inner part of the other cut away portion serving as a means to hold the pinion in mesh with the said teeth.

In testimony whereof I affix my signature.

CHARLES TELFORD REYNOLDS.